United States Patent
Krauth et al.

(10) Patent No.: US 8,789,421 B2
(45) Date of Patent: Jul. 29, 2014

(54) DEVICE FOR DETECTING A SELVAGE OF A MATERIAL WEB

(75) Inventors: Wolfgang Krauth, Friedberg (DE); Lars Zwerger, Augsburg (DE)

(73) Assignee: TexMag GmbH Vertriebsgesellschaft, Thalwil (CH)

( * ) Notice: Subject to any disclaimer, the term of this patent is extended or adjusted under 35 U.S.C. 154(b) by 609 days.

(21) Appl. No.: 13/069,550

(22) Filed: Mar. 23, 2011

(65) Prior Publication Data

US 2012/0192652 A1 Aug. 2, 2012

(30) Foreign Application Priority Data

Jan. 28, 2011 (DE) ...................... 20 2011 002 054 U (51) Int. Cl.
*H01L 41/08* (2006.01)
*G01N 29/24* (2006.01)

(52) U.S. Cl.
USPC ................ 73/632; 73/159; 310/367; 310/369

(58) Field of Classification Search
CPC .................................................. H01L 41/0833
USPC ............. 73/632, 641, 159; 310/326, 367, 369
See application file for complete search history.

(56) References Cited

U.S. PATENT DOCUMENTS

| | | | |
|---|---|---|---|
| 2,912,856 A * | 11/1959 | Kritz ........................... | 73/861.29 |
| 3,570,624 A | 3/1971 | O'Connor | |
| 4,176,337 A | 11/1979 | Aechter et al. | |
| 4,221,004 A | 9/1980 | Combs et al. | |
| 4,247,922 A | 1/1981 | Jackson et al. | |
| 4,254,478 A | 3/1981 | Dumas | |
| 4,901,292 A | 2/1990 | Schrauwen | |
| 4,963,807 A | 10/1990 | Wendling | |
| 5,027,993 A | 7/1991 | Ferguson | |
| 5,072,414 A | 12/1991 | Buisker et al. | |
| 5,274,573 A | 12/1993 | Buisker et al. | |
| 5,565,627 A | 10/1996 | Dorr | |
| 5,583,828 A | 12/1996 | Arai et al. | |
| 5,691,474 A * | 11/1997 | Gerz ............................... | 73/580 |
| 5,803,334 A | 9/1998 | Patel et al. | |
| 5,922,960 A * | 7/1999 | Toda ............................... | 73/597 |
| 6,175,419 B1 | 1/2001 | Haque et al. | |
| 6,289,729 B1 | 9/2001 | Haque et al. | |
| 6,323,948 B2 | 11/2001 | Haque et al. | |
| 6,356,846 B1 * | 3/2002 | Habeger et al. ................. | 702/40 |

(Continued)

FOREIGN PATENT DOCUMENTS

DE 3442154 5/1986
DE 4208294 9/1993

(Continued)

OTHER PUBLICATIONS

Search Report as issued in 20 2011 002 054.1 on Oct. 12, 2011.

(Continued)

*Primary Examiner* — Peter Macchiarolo
*Assistant Examiner* — Rose M Miller
(74) *Attorney, Agent, or Firm* — Fish & Richardson P.C.

(57) ABSTRACT

A device for detecting a selvage of a material web or the selvage position in one measuring direction. The device comprises at least one ultrasonic sensor, with the ultrasonic sensor comprising a transmitter element and a receiver element. The external contour of at least one of the transmitter elements and/or of the receiver elements comprises at least one arc segment side and at least one flattened side.

14 Claims, 11 Drawing Sheets

(56) References Cited

U.S. PATENT DOCUMENTS

| | | |
|---|---|---|
| 7,390,379 B2 | 6/2008 | Makkonen |
| 8,448,517 B2 * | 5/2013 | Itsumi et al. .................... 73/597 |
| 2010/0148633 A1 * | 6/2010 | Lee et al. ...................... 310/335 |
| 2011/0194724 A1 * | 8/2011 | Watanabe et al. ............. 381/398 |

FOREIGN PATENT DOCUMENTS

| | | |
|---|---|---|
| DE | 19500822 | 3/1996 |
| DE | 19905331 | 4/2000 |
| DE | 10 2006 029 139 | 12/2007 |
| WO | WO 2007091609 A1 * | 8/2007 |
| WO | WO 2009107192 A1 * | 9/2009 |

OTHER PUBLICATIONS

Uncertified Machine Translation of Search report issued in 20 2011 002 054.1 on Oct. 12, 2011.

\* cited by examiner

DEVICE FOR DETECTING A SELVAGE OF A MATERIAL WEB

CROSS-REFERENCE TO RELATED APPLICATIONS

This application claims priority to German Patent Application Serial No. 202011002054.1, filed on Jan. 28, 2011.

TECHNICAL FIELD

This invention relates to a device for detecting a selvage of a material web or the selvage position in one measuring direction, comprising at least one ultrasonic sensor. Such devices are used, for example, for the contact-free scanning of web edges of a sound-impermeable material web such as, for example, a material web of paper or foil. Devices equipped with an ultrasonic sensor are particularly suited for light-sensitive or transparent material webs for which the use of optical sensors is limited.

BACKGROUND

Devices for detecting a selvage of a material web or the selvage position in one measuring direction equipped with several ultrasonic sensors have been known, comprising a transmitter element and a receiver element having a circular shape, such as disclosed, for example, in DE 195 00 822. Providing a sufficiently large measuring range in the measuring direction requires in the case of these devices a larger number of ultrasonic sensors and more space, which increases the costs of the device as well.

ABSTRACT

A device for detecting a selvage of a material web or the selvage position in one measuring direction is described. The device comprises at least one ultrasonic sensor, with the ultrasonic sensor comprising a transmitter element and a receiver element.

The exterior contour of at least one of the transmitter elements and/or receiver elements comprises at least one arc segment side and at least one flattened side. This configuration makes an optimal arrangement of the transmitter element and/or of the receiver element or, respectively, of the transmitter elements and/or receiver elements possible. In this way, a sufficiently large measuring range in the measuring direction can be provided even with a small number of ultrasonic sensors. The space requirement is thereby reduced, i.e. the device is more compact and the costs of the device are reduced as well.

Exterior contour may be understood in this case as the exterior shape or, respectively, the profile of the element, in particular in a top view of the element.

Embodiments may comprise one or several of the following characteristics.

The device may be used for a contact-free scanning of a material web edge. The at least one transmitter element may be suitable for emitting ultrasonic impulses. The at least one receiver element may be suitable for receiving ultrasonic impulses. The ultrasonic sensor may be suitable for detecting the selvage or selvage position in the measuring direction of a material web running between the transmitter element and the receiver element. A measuring field may be allocated to each ultrasonic sensor in which the ultrasonic sensor can detect the selvage or selvage position. The measuring field may be ellipsoidal or oval. The measuring direction may run approximately vertically to the edge of the material web. Vertically is to be understood here and in the following as an angle of approximately 90°±10° or, respectively, 90°±5°, and approximately parallel as an angle of 0° or, respectively, 0°±10°, or, respectively, 0°±5°.

The device may comprise at least two ultrasonic sensors, in particular three ultrasonic sensors. The at least two ultrasonic sensors may be arranged in such a way that the measuring fields lie directly adjacent to each other or overlap in the measuring direction. In the measuring direction, the measuring fields may together form a measuring range in which detection of the selvage or of the selvage position is possible.

The device may comprise a first ultrasonic sensor and a second ultrasonic sensor. The external contour of the transmitter element and/or of the receiver element of the first ultrasonic sensor and of the transmitter element and/or receiver element of the second ultrasonic sensor may comprise at least one arc segment side and at least one flattened side. The flattened side of the transmitter element and/or of the receiver element of the first ultrasonic sensor and the flattened side of the second ultrasonic sensor may lie opposite each other at least partially in parallel at a distance.

The device may furthermore comprise a housing. The housing may be U-shaped. However, the housing may have any other suitable shape, for example it may be rectangular. Moreover, an electrical connection may be arranged on the housing.

The housing may comprise at least one first arm and one second arm. The at least one transmitter element may be arranged in the first arm and the at least one receiver element, in the second arm. The ultrasonic sensor may de be designed such that, in each case, the transmitter element and the receiver element lie opposite each other in corresponding fashion. The transmitter element and the receiver element may be arranged opposite each other in corresponding fashion in such a way that in each case the measuring field of the respective ultrasonic sensor is formed between them.

The transmitter element and the receiver element may be designed as two separate elements. The transmitter element and the receiver element may, however, also be integrated into one transmitter/receiver element. In the latter case, the transmitter/receiver element will function as transmitter as well as receiver. A reflector may be arranged at a distance from the transmitter/receiver element. The reflector may be suitable for reflecting the ultrasonic impulses emitted by the transmitter/receiver element back in the direction of the transmitter/receiver element.

The device may comprise a transmitter that comprises the transmitter element or, respectively, the transmitter elements. The device may comprise a receiver that comprises the receiver element or, respectively, the receiver elements. The number of transmitter elements and of receiver elements may be the same. In the case of one transmitter/receiver element, the device may comprise a transmitter/receiver that comprises the transmitter/receiver element or, respectively, the transmitter/receiver elements.

The at least one flattened side may be arranged approximately parallel to the measuring direction. In other words, if the measuring direction runs approximately vertically to the edge, the at least one flattened side may be arranged approximately vertically to the edge of the material web. This will assure that the measuring field or, respectively, the active area will be maintained in the measuring direction, for example as in the case of a circular element without a flattened side.

But the at least one flattened side may also be arranged approximately vertically to the measuring direction. However, this may reduce the measuring field or, respectively, the active area in the measuring direction as compared to a circular element without flattened side. The at least one flattened side may also be arranged at any other angle relative to the measuring direction.

The exterior contour of the at least one transmitter element and/or of the receiver element may comprise at least two arc segment sides and at least two flattened sides. The at least two flattened sides may run approximately parallel to each other. This will require even less space.

The at least one arc segment side may be round. The at least one arc segment side may be circular or ellipsoidal. The at least one flattened side may be a straight line. The at least one flattened side may form a chord. The chord may form an angle between 5° and 85°, in particular 25° and 65°, in particular 50° to 55°. The external contour may be round with at least two flattened sides running approximately parallel to each other.

The transmitter element and/or the receiver element may comprise a piezoelectric element, made, for example, of a piezoceramic material. The piezoelectric element may be surrounded by a sound transmission material like glass ceramics, for example, or respectively, the piezoelectric element may be imbedded into the sound transmission material. The sound transmission material may form one layer. The sound transmission material may be suitable to transmit or, respectively, couple ultrasonic impulses to the air. The exterior contour of the sound transmission material may comprise at least one arc segment side and at least one flattened side. The flattened side may be arranged in such a way that it will be at a sufficient distance relative to the piezoelectric element. This will assure a sufficient amount or, respectively, layer of sound transmission material.

The transmitter and/or the receiver may comprise a carrier, for example in the form of a plate. The transmitter elements and/or receiver elements may be arranged on the carrier or, respectively, be integrated into the latter. The transmitter elements and/or receiver elements may protrude relative to the surface of the carrier or be flush with the surface of the carrier.

The carrier may be suitable for sound insulation of the transmitter elements and/or the receiver elements. The carrier may be made of a sound insulation material, for example a casting compound, for example polyurethane, or another suitable material. The carrier may be round, rectangular or have another suitable shape.

The ultrasonic sensor may work in accordance with the principle of sound voltage transformation. In that case, the transmitter element will generate ultrasonic impulses that are transmitted to the receiver element by the air. Depending on how far the material web covers the receiver element, more or less sound energy will hit the receiver element. There, the sound energy can be transformed into a signal. The signal can be further processed.

The device may furthermore comprise a control. The control may be suitable for activating the transmitter element and the receiver element of only one ultrasonic sensor in each case. The signal or, respectively, the further processed signal may be transmitted to the control. The control may be suitable to switch between the ultrasonic sensors, depending on the selvage position or, respectively, depending on in which measuring field the material web edge happens to be at any given moment.

The device may be used, for example, in a system to control the position of the material web edge.

The material web may be made of a sound impermeable material, such as, for example, paper or foil. The material web may be made of light-sensitive or transparent material.

Figure 1:
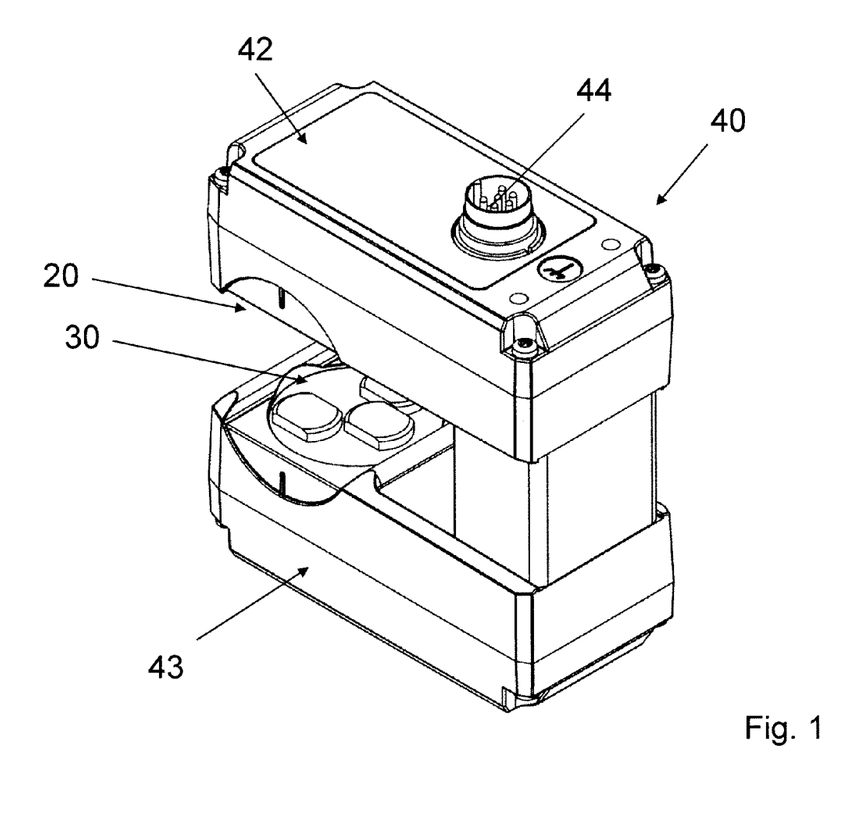
FIG. 1 shows a perspective view of a device for the detection of the selvage of a material web or of the selvage position.
Figure 2:
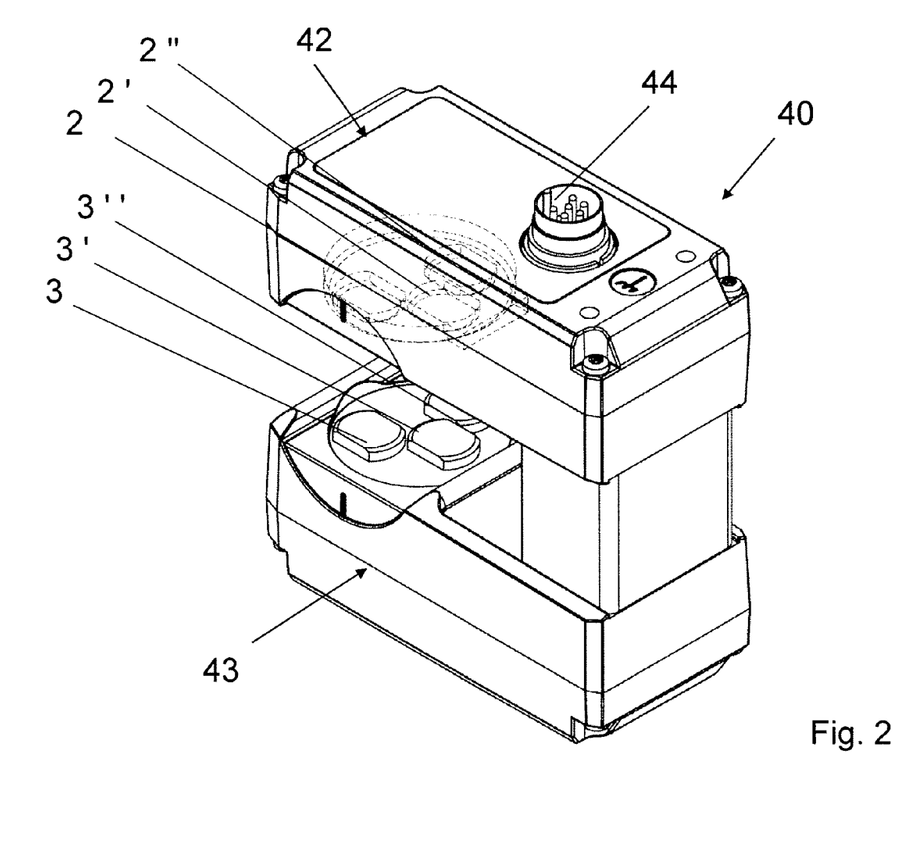
FIG. 2 shows another perspective view of the device of FIG. 1.

FIG. 1 shows a perspective view of a device for the detection of the selvage of a material web or of the selvage position in one measuring direction. FIG. 2 shows the device of FIG. 1 plus the transmitter 20 drawn in a broken line. The device shown in FIG. 1 and FIG. 2 comprises three ultrasonic sensors 1, 1', 1" that comprise in each case a transmitter element 2, 2', 2" and a receiver element 3, 3', 3". The transmitter elements 2, 2', 2" are in each case suitable for transmitting ultrasonic impulses. The receiver elements 3, 3', 3" are in each case suitable to receive ultrasonic impulses. The device comprises a transmitter 20 that comprises the three transmitter elements 2, 2', 2". The device comprises moreover a receiver 30 that comprises the three receiver elements 3, 3', 3". Therefore, the number of transmitter elements and of the receiver elements in FIG. 1 and FIG. 2 is the same. In the following, a description relative to a transmitter element is to be understood analogously relative to a corresponding receiver element, and vice versa.

The device disclosed in this description may, for example, be used in a system to control the position of the material web edge. The device is suitable for a contact-free scanning of the material edge. The material web may be made of a sound impermeable material, such as, or example, paper or foil. The material web may be made of a light-sensitive or transparent material.

Figure 3:
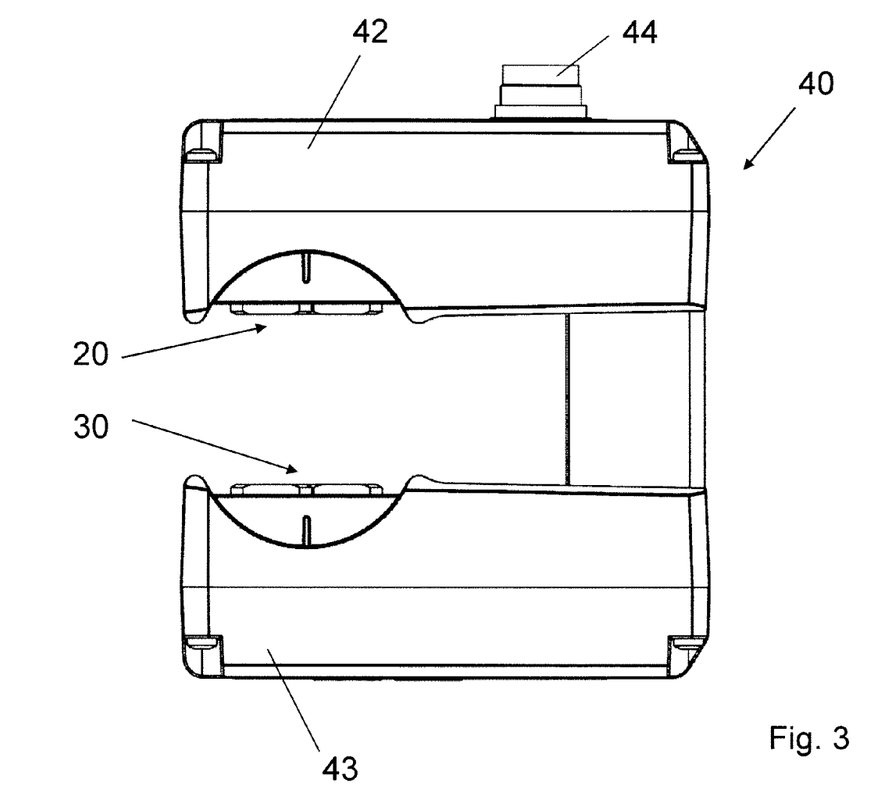
FIG. 3 shows a lateral view of the device of FIG. 1 and FIG. 2.

FIG. 3 shows a lateral view of the device of FIG. 1 and FIG. 2. The device comprises a housing 40. Furthermore, an electric connection 44 is arranged on the housing 40. In FIG. 1 to FIG. 3, the housing has a U-shaped design. But the housing may have any other suitable shape, for example it may be rectangular.

The housing of FIG. 1 to FIG. 3 comprises a first arm 42 and a second arm 43. The transmitter elements 2, 2', 2" are arranged in the first arm 42 and the receiver elements 3, 3', 3", in the second arm 43. Alternatively, the transmitter elements 2, 2', 2" may be arranged in the second arm 43 and the receiver elements 3, 3', 3", in the first arm. Each of the ultrasonic sensors 1, 1', 1" is designed in such a way that the transmitter element 2, 2', 2" and the receiver element 3, 3', 3" lie opposite each other in corresponding fashion (i.e. transmitter element 2 lies opposite receiver element 3 in corresponding fashion, transmitter element 2' lies opposite receiver element 3' in corresponding fashion, etc.) The transmitter elements and receiver elements are arranged opposite each other in corresponding fashion in such a way that a measuring field F, F', F" of the corresponding ultrasonic sensor 1, 1', 1" will be formed between them.

But alternatively to the arrangement shown in FIG. 1 to FIG. 3 in which the transmitter element 2 and the receiver element 3 are designed as two separate elements, the transmitter element and the receiver element may also be integrated into one transmitter/receiver element. In that case, the device will comprise a transmitter/receiver that comprises the transmitter/receiver element or, respectively, the transmitter/receiver elements. Therefore, the transmitter/receiver element functions as a transmitter as well as a receiver. In that case, a reflector may be arranged at a distance from the transmitter/receiver element. The reflector may be suitable to reflect the ultrasonic impulses emitted by the transmitter/receiver element back in the direction of the transmitter/receiver element.

Figure 4:
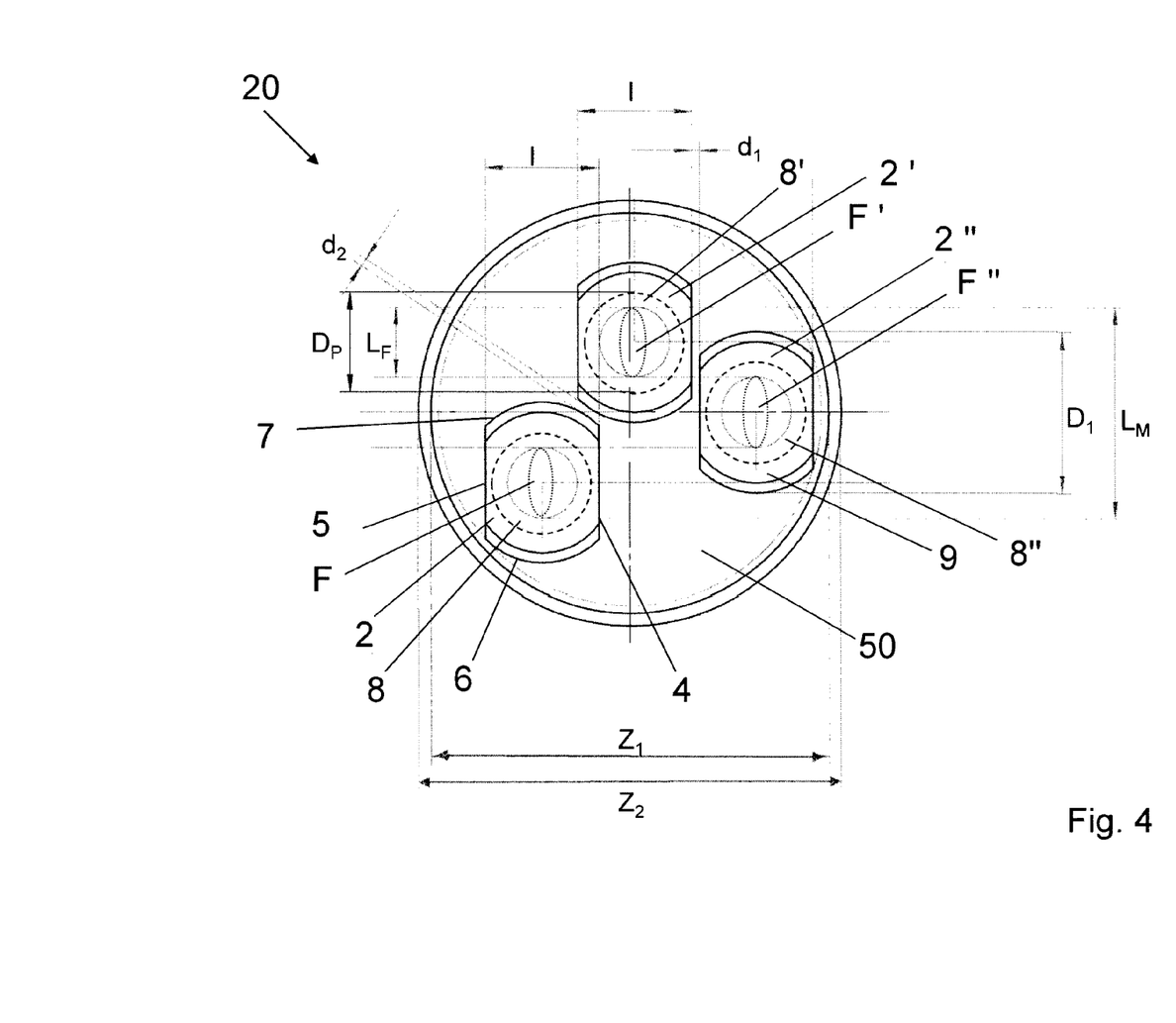
FIG. 4 shows a top view of a transmitter of a device for the detection of the selvage of a material web or of the selvage position.
Figure 5:
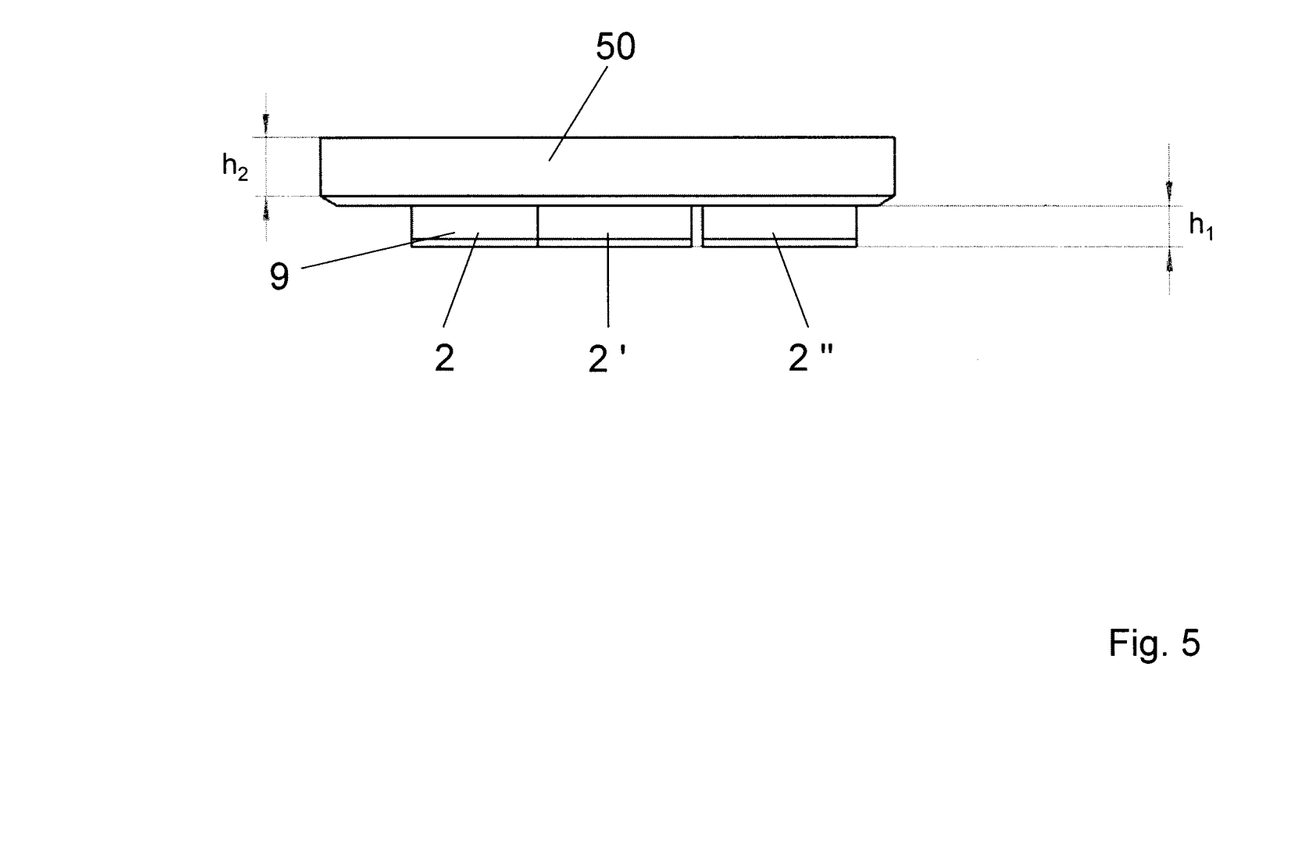
FIG. 5 shows a lateral view of the transmitter of FIG. 4.

FIG. 4 shows a top view of a transmitter of a device for the detection of the selvage of a material web or of the selvage position, and FIG. 5 shows a lateral view of the transmitter of FIG. 4. As can be seen in FIG. 4, the external contour (here, for example, the profile of the element in a top view of the element) of the transmitter element 2, 2', 2" comprises two arc segment sides 6, 7; 6', 7; 6", 7" and two flattened sides 4, 5; 4', 5; 4", 5".

Figure 6:
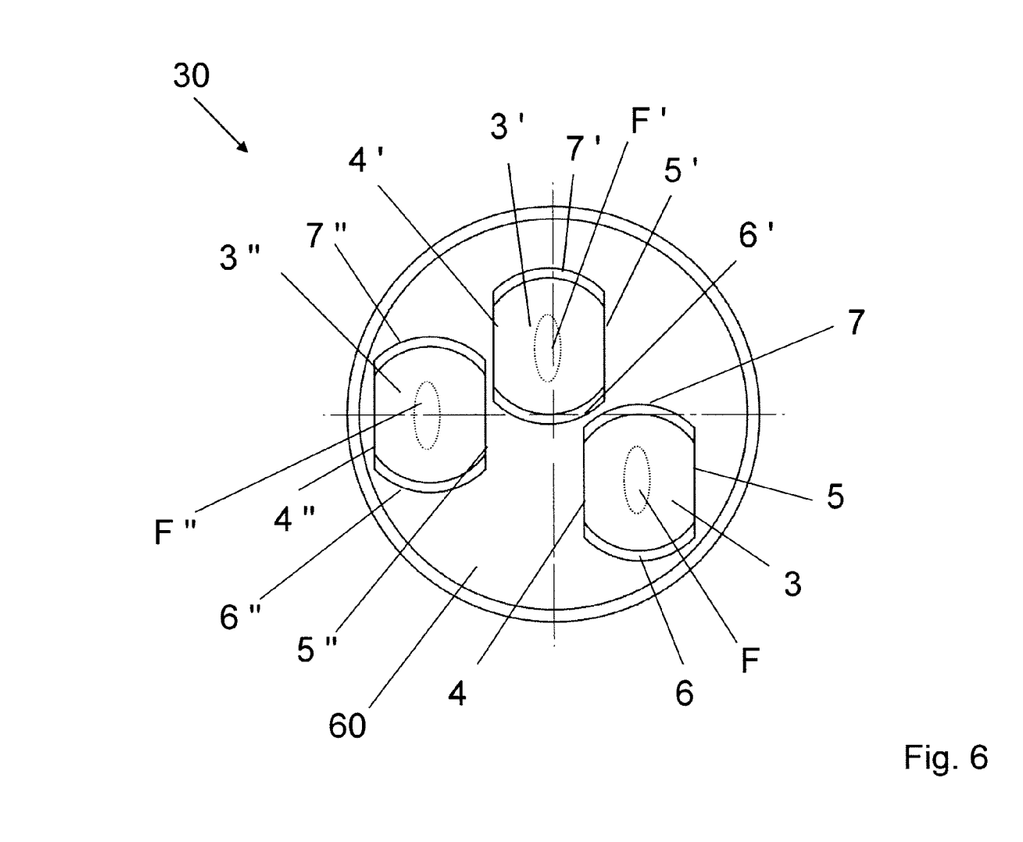
FIG. 6 shows a top view of a receiver of a device for the detection of the selvage of a material web or of the selvage position.

FIG. 6 shows a top view of a receiver of a device for the detection of the selvage of a material web or of the selvage position. The receiver elements 3, 3', 3" of the receiver of FIG. 6 may be arranged opposite each other corresponding to the transmitter elements 2, 2', 2" of the transmitter of FIG. 4 such as can be seen, for example, in FIG. 1 to FIG. 3. As can be seen from FIG. 6, the external contour of the receiver element 3, 3', 3" also comprises two arc segment sides 6, 7; 6', 7; 6", 7" and two flattened sides 4, 5; 4', 5; 4", 5". Alternatively, only the transmitter elements or the receiver elements may have an exterior shape comprising at least one arc segment side and at bleat one flattened side. In addition, only some but not all of the transmitter elements and/or receiver elements may have an external shape comprising at least one arc segment side and at least one flattened side.

This configuration, with an arc segment side and a flattened side, makes an optimal arrangement of the transmitter elements and receiver elements possible. In this way it will be possible to provide a sufficiently large measuring range even with a small number of ultrasonic sensors, for example three ultrasonic sensors as shown in FIG. 1 to FIG. 6. This reduces the required space, i.e. the device is more compact and the costs of the device are reduced as well.

In FIG. 1 to FIG. 6, the two flattened sides 4, 5; 4', 5; 4", 5" run in each case approximately parallel to each other (in this description, approximately parallel means an angle of 0° r, respectively, 0°±10° or, respectively, 0°±5°). This reduces the space requirement even further.

The arc segment sides 6, 7; 6', 7; 6", 7" are round or, respectively, circular. However, they may be ellipsoidal as well. The flattened sides 4, 5; 4', 5; 4", 5" are in each case straight lines. The flattened sides 4, 5; 4', 5; 4", 5" form in each case a chord. Therefore, the external contour is round or, respectively circular with two flattened sides 4, 5; 4', 5; 4", 5" that run approximately parallel to each other.

With regard to FIG. 1 to FIG. 6, the device comprises a first ultrasonic sensor 1', a second ultrasonic sensor 1", and a third ultrasonic sensor 1. As can be seen in the case of the transmitter of FIG. 4, (the same applies analogously to the receiver of FIG. 6), the external contour of the transmitter element 2' of the first ultrasonic sensor 1', of the transmitter element 2" of the second ultrasonic sensor 1" and of the transmitter element 2 of the third ultrasonic sensor 1 comprises in each case two arc segment sides 6', 7; 6", 7"; 6, 7 and two flattened sides 4', 5; 4", 5"; 4, 5. One of the flattened sides 4', 5' of the transmitter element 2' of the first ultrasonic sensor 1' and one of the flattened sides 4", 5" of the second ultrasonic sensor 1" lie at least partially parallel opposite each other at a distance $d_1$. One of the arc segment sides 6', 7' of the first transmitter element 2' and one of the arc segment sides 6, 7 of the third transmitter element 2 lie opposite each other at a distance $d_2$.

The transmitter elements 2, 2', 2" of FIG. 4 (the same applies analogously to the receiver of FIG. 6) comprise in each case a (circular) piezoelectric element 8, 8', 8" (with diameter $D_P$), for example one made of a piezoceramic material. The piezoelectric element 8, 8', 8" is surrounded by or, respectively, embedded in a sound transmission material 9, for example glass ceramics. Therefore, the piezoelectric element 8, 8', 8" in FIG. 4 is represented by a broken line. The sound transmission material 9 forms a layer above the piezoelectric element 8, 8', 8". The sound transmission material 9 is suitable to transfer or, respectively, couple ultrasonic impulses to the air.

As can be seen in FIG. 4, the external contour of the sound transmission material 9 comprises the arc segment sides 6, 7 and the flattened sides 4, 5. The flattened sides 4, 5 are arranged in such a way that they are in each case sufficiently distanced from the piezoelectric element 8, 8', 8". This assures a sufficient amount or, respectively, layer of sound transmission material 9. The thickness of the sound transmission material 9 into which the piezoelectric element 8, 8', 8" is imbedded is marked in FIG. 5 with $h_1$.

As can be further seen in FIG. 4 and FIG. 5, the transmitter 20 comprises a carrier 50, here in the form of a plate. The thickness of the carrier 50 is marked in FIG. 5 with $h_2$. The receiver 30 (FIG. 6) likewise comprises a carrier 60, here in the form of a plate. The transmitter elements 2, 2', 2" or, respectively, the receiver elements 3, 3', 3" are arranged on the carrier 50 or, respectively, carrier 60 or, respectively, integrated into the latter. The transmitter elements 2, 2', 2" or, respectively, the receiver elements 3, 3', 3" protrude relative to the surface of the carrier 50 or, respectively, 60. Alternatively, however, they may be flush with the surface of the carrier.

The carrier 50 or, respectively, carrier 60 is suitable for sound insulation of the transmitter elements 2, 2', 2" or, respectively, of the receiver elements 3, 3', 3".

The carrier 50 or, respectively, carrier 60 is made of a sound insulation material, for example a casting compound, for example polyurethane, or another suitable material. The carrier 50 of FIG. 4 or, respectively, carrier 60 of FIG. 6 is round or, respectively, circular to round. However, alternatively, the carrier may be rectangular or have another suitable shape.

In FIG. 4, $D_1$ denotes the diameter of the transmitter element 2, 2', 2". $L_F$ marks the dimension of the measuring field F, F', F" of the transmitter element 2, 2', 2". The measuring field is represented in FIG. 4 ellipsoidal or, respectively, oval. Here, the dimension $L_F$ is the longest line between two points of the ellipsoidal or, respectively, oval measuring field F, F', F". In comparison with a circular transmitter element without flattened side that would have a circular measuring field, in this case, the provision of the flattened side or, respectively, sides 4, 5 reduces the amount or, respectively, the layer of sound insulation material 9 at the respective flattened side 4, 5. This also reduces or, respectively, flattens the total surface of the measuring field F, F', F" on the side of the measuring field corresponding to the flattened side, and the measuring field is therefore ellipsoidal or, respectively, oval.

Moreover, in FIG. 4, $D_P$ stands for the diameter of the piezoelectric element 8, 8', 8". $Z_i$ denotes the diameter of the sensor or, respectively, of the carrier 50 without bevel and $Z_2$ stands for the overall diameter of the transmitter or, respectively, of the carrier 50 (with bevel). The distance 1 is the distance between the two flattened sides of one element. $L_M$ marks the measuring range (overall measuring range) of the device in the measuring direction M.

The three ultrasonic sensors 1, 1', 1" of FIG. 1 to FIG. 6 are arranged in such a way m that the measuring fields F, F', F" are directly adjacent to each other in the measuring direction M or, respectively, slightly overlap. The measuring fields F, F', F" together form the measuring range $L_M$ in the measuring direction M in which a detection of the edge or of the edge position is possible.

Figure 7:
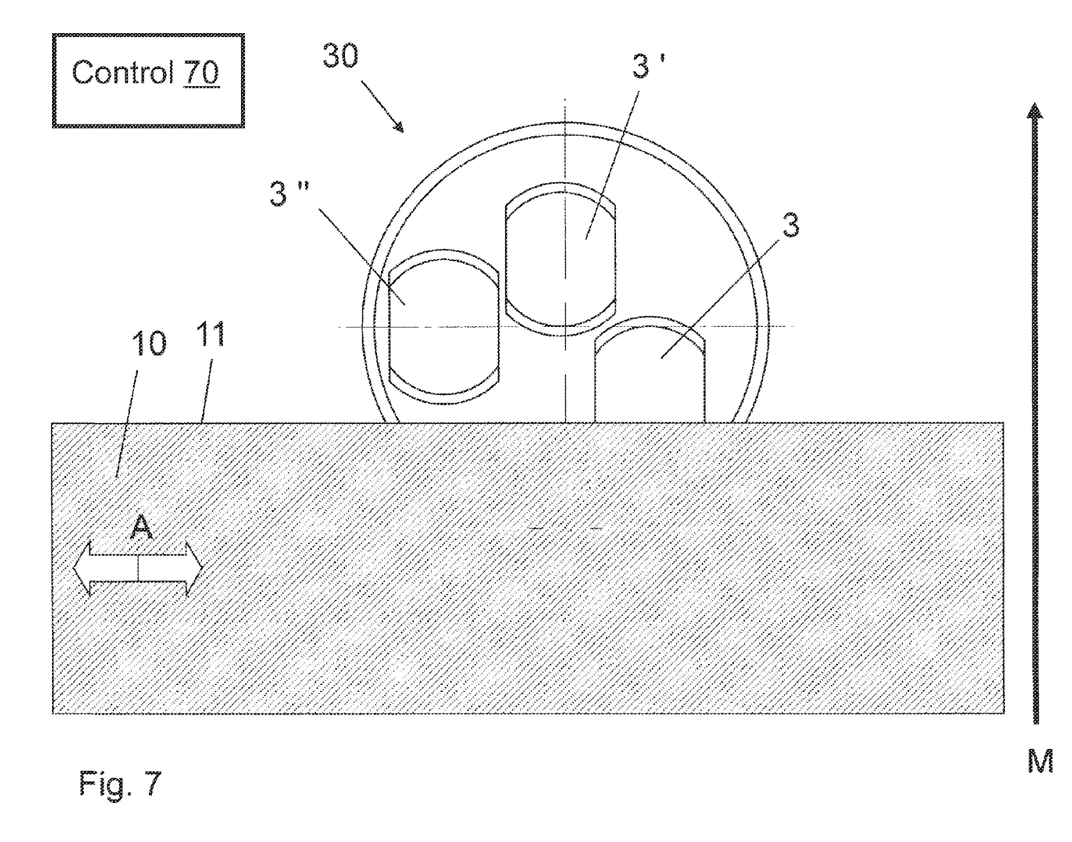
FIG. 7 shows the receiver of FIG. 6 and a material web.

FIG. 7 shows the transmitter of FIG. 6 and a material web 10 that can move in one running direction A. The ultrasonic sensor 1 is suitable for detecting the edge 11 or the edge position in one measuring direction M of the material web 10 running between the transmitter elements 2, 2', 2" and the receiver elements 3, 3', 3" (or, respectively, the transmitter 20 and the receiver 30). A measuring field F, F', F" (not shown in FIG. 7) is in each case allocated to each ultrasonic sensor 1, 1', 1" in which the ultrasonic sensor 1, 1', 1" can detect the edge 11 or the edge position. The measuring direction M runs approximately vertically to the edge 11 of the material web (in this description, approximately vertically means an angle of approximately 90° or, respectively, 90°±10° or, respectively 90°±5°).

In the case of the receiver of FIG. 2 which also corresponds to the receiver represented in FIG. 7, the measuring direction M runs in a fixed direction due to the U-shape of the housing 40, namely in the direction of the open side of the U-shaped housing 40 or, respectively, in the opposite direction. However, the housing may have any other suitable shape, for example, it may be rectangular.

If, for example, two separate housing components (not connected with each other by a housing) were used for the transmitter and the receiver, several different arrangements and therefore several different measuring directions would be realizable.

Each ultrasonic sensor 1, 1', 1" works in accordance with the principle of sound voltage transformation. The transmitter element 2, 2', 2" generates ultrasonic impulses that are transmitted by the air to the corresponding receiver element 3, 3', 3" (i.e., transmitter element 2 to receiver element 3, transmitter element 2' to receiver element 3', etc.). Depending on how far the material web 10 covers the respective receiver element 3, 3', 3", more or less sound energy will hit the respective receiver element 3, 3', 3". There, the sound energy can be transformed into a signal. A detection of the presence or absence of the material web edge 11 may occur (detection of the edge), or a detection or, respectively, determination of the position of the edge 11 in the measuring direction may occur.

The device comprises moreover a control. The control is suitable to activate the transmitter element 2, 2', 2" and the receiver element 3, 3', 3" of only one ultrasonic sensor 1, 1', 1" in each case. The signal or, respectively, the processed signal is transmitted to the control. The control is suitable to switch between the ultrasonic sensors 1, 1', 1", depending on the edge position or, respectively, depending on in which measuring field F, F', F" the material web edge 11 happens to be at any given moment.

For example, in the representation shown in FIG. 7, the material web edge 11 is located in the measuring field F' of the ultrasonic sensor l' comprising transmitter element 2' and receiver element 3'. Accordingly, the control 70 will activate in this case only the transmitter element 2' and the receiver element 3'. If the material web edge 11 were moving in the measuring direction M into the measuring field F" of the ultrasonic sensor 1" comprising transmitter element 2" and receiver element 3" (in FIG. 7 upward), the control 70 would switch from the ultrasonic sensor 1' to ultrasonic sensor 1".

As can be seen in FIG. 7, the flattened sides 4, 5; 4', 5; 4", 5" are arranged approximately parallel to the measuring direction M. In other words, since the measuring direction M runs approximately vertically to the material web edge 11, the flattened sides 4, 5; 4', 5; 4", 5" are arranged approximately vertically to the edge 11 of the material web 10. This will assure that the measuring field or, respectively, the active surface is maintained in the measuring direction like in the case of a perfectly circular element without a flattened side, for example. This will be explained in the following with reference to FIG. 8 to FIG. 10.

Figure 8:
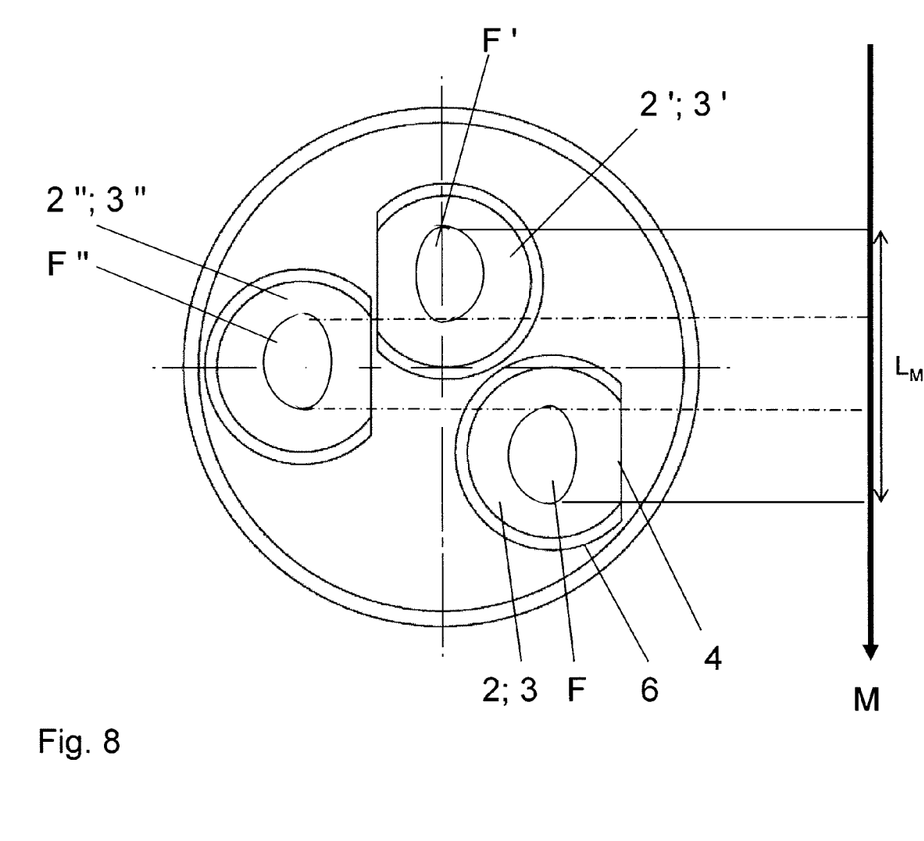
FIG. 8 shows a top view of a transmitter and/or a receiver, with the flattened sides being arranged parallel to the measuring direction.

FIG. 8 shows a top view of a transmitter and/or receiver comprising three transmitter elements and/or receiver elements 2, 2', 2"; 3, 3', 3", with the flattened sides 4 being arranged parallel to the measuring direction M. In contrast with the device of FIG. 1 to FIG. 7, the exterior contour of the transmitter elements or, respectively, receiver elements in FIG. 8 comprises only one arc segment side 6 and only one flattened side 4. A measuring field F, F', F" is allocated to each ultrasonic sensor 1, 1', 1" in which the respective ultrasonic sensor 1, 1', 1" can detect the edge or edge position. In FIG. 8, one part or, respectively, one half of the measuring field F, F', F" is ellipsoidal (or, respectively, oval) and the other part or, respectively, other half of the measuring field. is circular. Thus, by providing the flattened side 4, the amount or, respectively, the layer of sound insulation material 9 is reduced only on one flattened side 4. This reduces or, respectively, flattens the total area of the measuring field only on the side of the measuring field corresponding go the flattened side 4 and it therefore becomes ellipsoidal or, respectively, oval.

Figure 9:
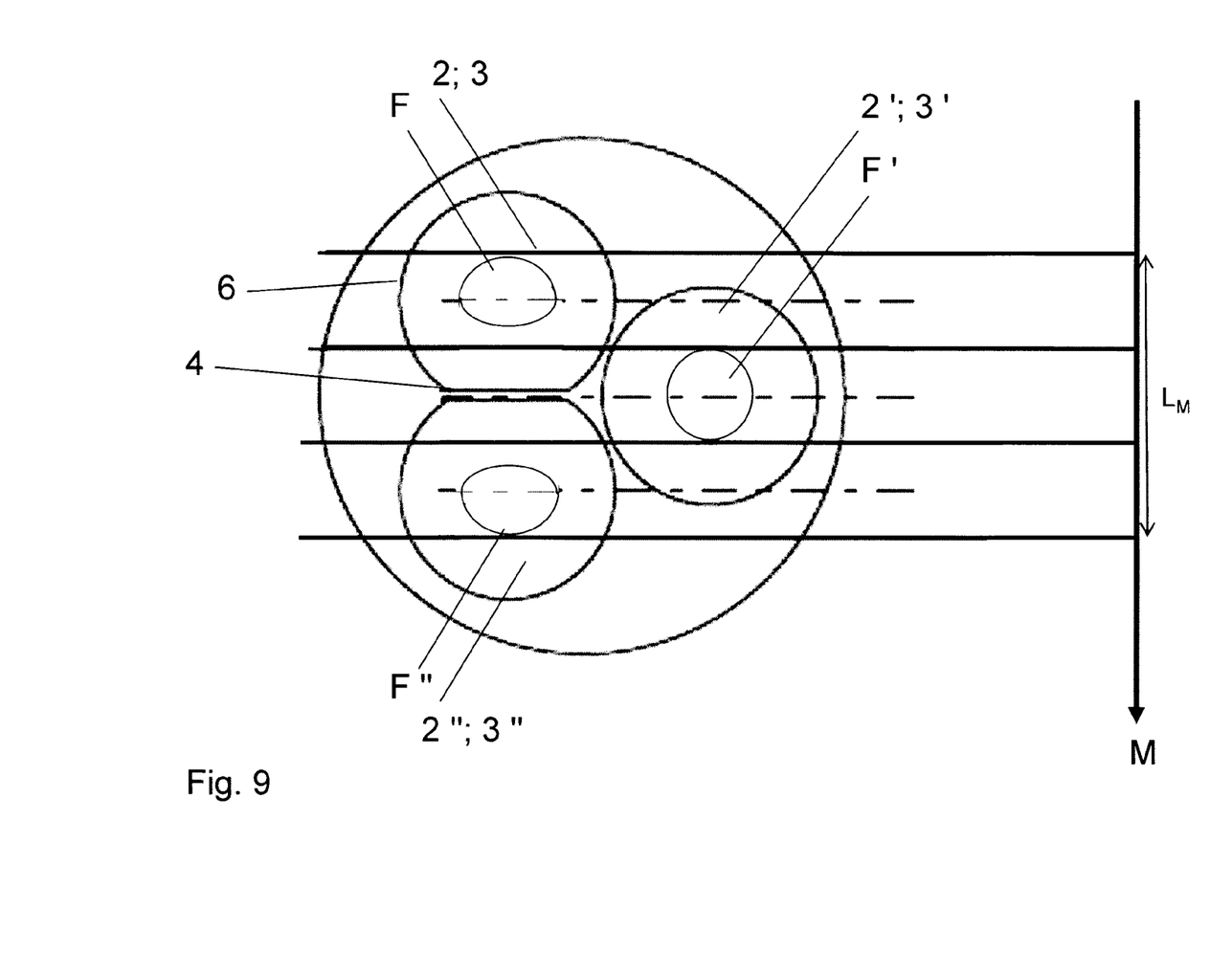
FIG. 9 shows a top view of a transmitter and/or a receiver, with the flattened sides being arranged vertical to the measuring direction.

Alternatively, however, the flattened side4 may also be arranged approximately vertically to the measuring direction M. FIG. 9 shows a top view of a transmitter and/or receiver comprising three transmitter elements and/or receiver elements 2, 2', 2"; 3, 3', 3". The transmitter element and/or receiver element 2; 3' has a circular design. The transmitter element and/or receiver element 2; 3' comprise in each case a flattened side 4 that is arranged vertically to the measuring direction M. However, this reduces the measuring field or, respectively, the active surface in the measuring direction M, as compared to a circular element without flattened side like 2; 3' (or an element with a flattened side parallel to the measuring direction M).

However, the measuring field may also have any other shape, depending on the construction type of the transmitter element and/or of the receiver element.

Figure 10:
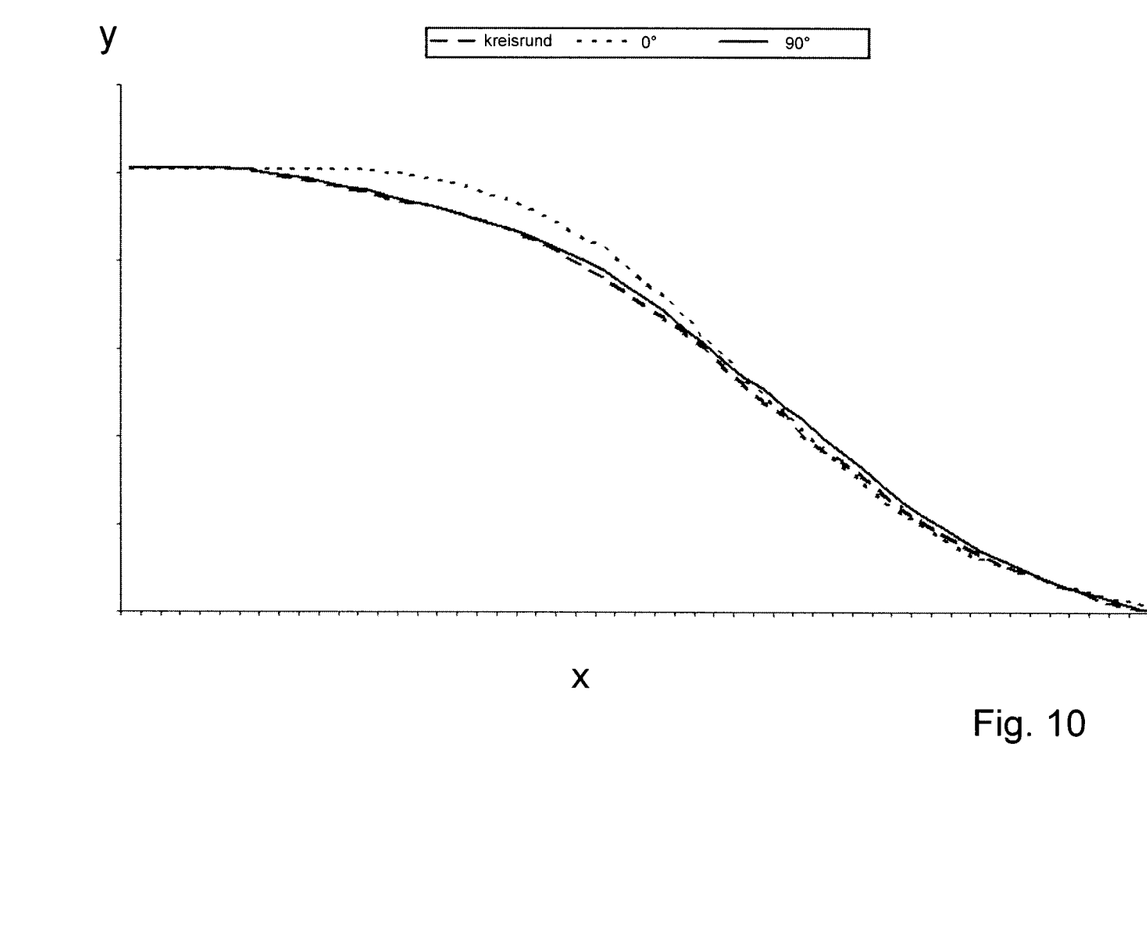
FIG. 10 shows a measuring diagram of an ultrasonic sensor in three different versions.

FIG. 10 shows a measuring diagram of a ultrasonic sensor in three different types: round without flattened side (broken line), flattened side at 0° or, respectively, parallel to the material web edge (dotted line), flattened side at 90° or, respectively, vertically to the material web edge (solid line). The ultrasonic sensor of the broken line (round without flattened side) corresponds, for example, to the ultrasonic sensor 1" of FIG. 9. The ultrasonic sensor of the dotted line (0° or, respectively, parallel to the material web edge 11; or, in other words, at 90° or, respectively vertically to the measuring direction M) corresponds, for example, to the ultrasonic sensor 1 and/or the ultrasonic sensor 1" of FIG. 9. The ultrasonic sensor of the solid line (90° or, respectively, vertically to the material web edge 11; or, in other words, at 0° or, respectively, parallel to the measuring direction M) corresponds, for example, to one of the ultrasonic sensors 1, 1', 1" of FIG. 8.

The y-axis of FIG. 10 indicates the output signal of the receiver (for example, in pixels), and the x-axis indicates the position of the material web selvage (for example, in mm) The transmitter element and/or receiver element underlying the measurement of FIG. 10 has, for example, a diameter $D_1$ of approximately 16 mm. The transmitter element and/or receiver element may, however, also have any other suitable diameter, depending on the measuring range $L_M$ to be provided. Diameters of approximately 12 mm, 14 mm, 18 mm, 20 mm etc. are named as samples only.

The measuring field F of the ultrasonic sensor with the dimensions $L_F$ is located on the x-axis between the points, which correspond to approximately 5% to approximately 95% of the (maximum) output signal of the receiver.

As can be seen in FIG. 10, the output signal of the receiver of the ultrasonic sensor with flattened side runs at 90° or perpendicular to the material web selvage (solid line) similar to the output signal of the receiver of the ultrasonic sensor, which is round without a flattened side (broken line). The dimension $L_F$ (the longest line between two points of the ellipsoidal or oval measuring field) of the measuring field of the broken line, and the dimension (diameter) of the measuring field of the solid line are approximately equal, as evident in FIG. 10. The configuration of the ultrasonic sensor with a flattened side at 90% or perpendicular to the material web selvage (solid line) guarantees therefore that the measuring field and, respectively, the active area in the measuring direction M is maintained. The smaller total area therefore does not affect the active area in the measuring direction M.

In contrast, the output signal of the receiver of the ultrasonic sensor with a flattened side at 0° or parallel to the material web selvage (dotted line) begins to decrease at higher x-values only and then approaches the other two characteristics. The dimension $L_F$ of the measuring field in the measuring direction M of this configuration is therefore smaller in comparison to a perfectly circular element without a flattened side (broken line) or an element with a flattened side parallel to the measuring direction (solid line). This configuration effectively reduces the measuring field and, respectively, the active area in the measuring direction M.

Figure 11:
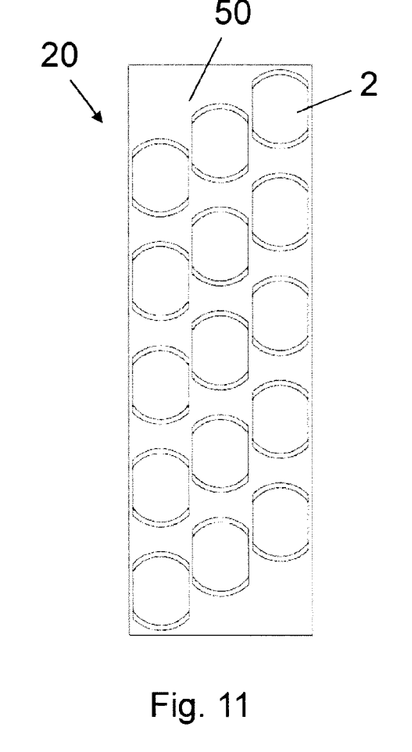
FIG. 11 shows a top view of a transmitter of a device for the detection of the selvage of a material web or of the selvage position.
Figure 12:
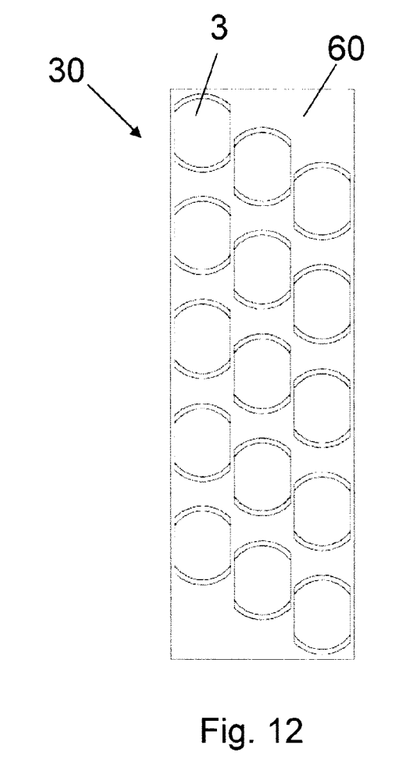
FIG. 12 shows atop view of a receiver of a device for the detection of the selvage of a material web or of the selvage position.

FIGS. 1 to 9 represent three ultrasonic sensors or three transmitter elements and/or receiver elements respectively. However, any other suitable number of transmitter elements and/or receiver elements may be provided as well. FIG. 11, for example, shows a top view of a receiver 30, wherein the transmitter 20 and the receiver 30 respectively comprise multiple transmitter elements 2 and receiver elements 3, in particular more than three elements, for example 18 elements, as shown here. The transmitter elements 2 and receiver elements 3, respectively, form a pattern of multiple rows of transmitter elements and receiver elements at an angle (in FIG. 11 and FIG. 12, they are five rows of three elements each, i.e. 15 elements total, configured below and above one another). The carrier 50 of the transmitter 20 in FIG. 11 and the carrier 60 of the receiver 30 in FIG. 12 are each rectangular.

The invention claimed is:

1. A device for detecting a selvage of a material web or the selvage position in one measuring direction, the device comprising:
   at least one ultrasonic sensor operable to detect the selvage or the selvage position, wherein the ultrasonic sensor comprises a transmitter element and a receiver element,
   wherein the external contour of the transmitter element, the external contour of the receiver element, or the external contours of both the transmitter element and the receiver element comprises at least one arc segment side and at least one flattened side,
   wherein at least one of the transmitter element or the receiver element comprises a piezoelectric element surrounded by a sound transmission material, and
   wherein the external contour of the sound transmission material comprises at least one arc segment side and at least one flattened side.

2. The device of claim 1, wherein the ultrasonic sensor is suitable for detecting the selvage or selvage position in the measuring direction of a material web running between the transmitter element and the receiver element.

3. The device of claim 1, wherein a measuring field is allocated to the ultrasonic sensor in which the ultrasonic sensor can detect the selvage or selvage position.

4. The device of claim 1 comprising at least two ultrasonic sensors.

5. The device of claim 4, wherein the at least two ultrasonic sensors are arranged in such a way that the measuring fields lie directly adjacent to or overlap each other in the measuring direction.

6. The device of claim 1 comprising a first ultrasonic sensor and a second ultrasonic sensor, wherein the external contour of the transmitter element and/or of the receiver element of the first ultrasonic sensor and of the transmitter element and/or of the receiver element of the second ultrasonic sensor comprises at least one arc segment side and at least one flattened side.

7. The device of claim 6, designed in such a way that the flattened side of the transmitter element and/or of the receiver element of the first ultrasonic sensor and the flattened side of the second ultrasonic sensor lie at least partially parallel opposite each other at a distance.

8. The device of claim 1, further comprising a housing comprising at least one first arm and a second arm, wherein the transmitter element is arranged in the first arm and the receiver element, in the second arm.

9. The device of claim 1, wherein the transmitter element and the receiver element are integrated into one transmitter/receiver element.

10. The device of claim 1, wherein the at least one flattened side is arranged approximately parallel to the measuring direction.

11. The device of claim 1, wherein the external contour of the at least one transmitter element and/or receiver element comprises at least two arc segment sides and at least two flattened sides.

12. The device of claim 1, wherein the at least one arc segment side is circular or ellipsoidal.

13. The device of claim 1, wherein the at least one flattened side forms a chord.

14. The device of claim 1, further comprising a control, wherein the control is suitable for activating the transmitter element and receiver element of only one ultrasonic sensor in each case.

* * * * *